US007917680B2

(12) United States Patent
Locker

(10) Patent No.: US 7,917,680 B2
(45) Date of Patent: Mar. 29, 2011

(54) PERFORMANCE BASED PACKET ORDERING IN A PCI EXPRESS BUS

(75) Inventor: Kevin Locker, Scottsdale, AZ (US)

(73) Assignee: NXP B.V., Eindhoven (NL)

( * ) Notice: Subject to any disclaimer, the term of this patent is extended or adjusted under 35 U.S.C. 154(b) by 372 days.

(21) Appl. No.: 11/719,532

(22) PCT Filed: Nov. 18, 2005

(86) PCT No.: PCT/IB2005/053821
§ 371 (c)(1),
(2), (4) Date: May 16, 2007

(87) PCT Pub. No.: WO2006/054266
PCT Pub. Date: May 26, 2006

(65) Prior Publication Data
US 2009/0144478 A1 Jun. 4, 2009

Related U.S. Application Data

(60) Provisional application No. 60/629,206, filed on Nov. 18, 2004.

(30) Foreign Application Priority Data
Nov. 18, 2005 (WO) ............... PCT/IB05/053821

(51) Int. Cl.
*G06F 13/36* (2006.01)
(52) U.S. Cl. ..................... 710/311; 711/154

(58) Field of Classification Search .......... 710/310–315; 711/147, 154
See application file for complete search history.

(56) References Cited

U.S. PATENT DOCUMENTS
2004/0064626 A1* 4/2004 Shah et al. .................. 710/310
2004/0213152 A1 10/2004 Matuoka et al.

FOREIGN PATENT DOCUMENTS
CN 1531282 A 9/2004

OTHER PUBLICATIONS

"PCI Express Base Specifications Revision 1.0A", PCI-SIG, Apr. 2003.
Office Action from Chinese Patent Appln. No. 200580039435.6 (Sep. 11, 2009), w/ English transln.

* cited by examiner

*Primary Examiner* — Clifford H Knoll

(57) ABSTRACT

A communications arrangement is implemented for packet data communications control. According to an example embodiment of the present invention, a communications arrangement (100), such as a PCI Express type arrangement, carries out separate arbitration functions (112, 116, 117, 118) for ordering packet data. One of the arbitration functions (112) orders the packet data in accordance with protocol standards (e.g., to meet PCI Express standards when implemented with a PCI Express system). The other arbitration function (116, 117, 118) orders the packet data in accordance with performance standards while maintaining compliance with the protocol standards.

20 Claims, 4 Drawing Sheets

PERFORMANCE BASED PACKET ORDERING IN A PCI EXPRESS BUS

The present invention relates generally to passing information and, more particularly, to the passing of information involving the merging of multiple packet streams.

Many different types of electronic communications are carried out for a variety of purposes and with a variety of different types of devices and systems. One type of electronic communications system involves those communications associated with packet-based communications between two or more different components. For instance, computers typically include a central processing unit (CPU) that communicates with peripheral devices via a bus. Instructions and other information are passed between the CPU and the peripheral devices on a communications BUS or other link and often use packetized data streams.

In typical high performance packet-based systems, packet ordering rules are implemented to ensure accurate data transfer and to meet other desirable performance characteristics. These rules are generally associated with a particular protocol, the enforcement of which is important for the consistent and reliable operation of the system.

One challenge to the operation of packet-based systems involves the processing of multiple packet streams. Systems employing packet-based communications typically employ data paths over which multiple packet streams are passed. When packet streams are communicated simultaneously, the streams are often merged at a particular point in a datapath and passed accordingly along the datapath. Points in a datapath where two or more packet streams are merged can be a performance bottleneck. For example, merging packet streams typically involves the use of channels along which the streams are communicated. Often, data collisions can occur when implemented with channels. In addition, the coordination of the use of such channels can become challenging when the amount of data being processed is high, and when particular protocols need to be followed when coordinating the communication.

The above-discussed challenges are associated with a variety of communications approaches involving packet communications. One type of packet-based communications approach involves the use of a PCI (Peripheral Component Interconnect) system. PCI is an interconnection system between a microprocessor and attached devices in which expansion slots are spaced closely for high speed operation. Using PCI, a computer can support new PCI cards while continuing to support Industry Standard Architecture (ISA) expansion cards, which is an older standard. PCI is designed to be independent of microprocessor design and to be synchronized with the clock speed of the microprocessor. PCI uses active paths (on a multi-drop bus) to transmit both address and data signals, sending the address on one clock cycle and data on the next. The PCI bus can be populated with adapters requiring fast accesses to each other and/or system memory and that can be accessed by a host processor at speeds approaching that of the processor's full native bus speed. Read and write transfers over the PCI bus are implemented with burst transfers that can be sent starting with an address on the first cycle and a sequence of data transmissions on a certain number of successive cycles. The length of the burst is negotiated between the initiator and target devices and may be of any length. PCI-type architecture is widely implemented, and is now installed on most desktop computers.

PCI Express architecture exhibits similarities to PCI architecture with certain changes. PCI Express architecture employs a switch that replaces the multi-drop bus of the PCI architecture with a switch that provides fan-out for an input-output (I/O) bus. The fan-out capability of the switch facilitates a series of connections for add-in, high-performance I/O. The switch is a logical element that may be implemented within a component that also contains a host bridge. A PCI switch can logically be thought of, e.g. as a collection of PCI-to-PCI bridges in which one bridge is the upstream bridge that is connected to a private local bus via its downstream side to the upstream sides of a group of additional PCI-to-PCI bridges.

Packet streams communicated in PCI Express types of systems are often merged as discussed above, which can be a performance consideration in the system. The speed and accuracy at which the merging is carried out affects the PCI Express type system's operation. Furthermore, packet stream processing must be compliant with protocols associated with PCI Express (or whichever system protocols or standard is/are implemented). With PCI Express systems, these protocols typically specify particular ordering rules that should be used when merging packet streams, in order to comply with the protocol (or standard). Compliance with these types of protocols, while achieving desirable performance (e.g., relatively low latency and relatively high bandwith) has been challenging.

These and other limitations present challenges to the implementation of packet-based communications with a variety of communications approaches including PCI Express communications approaches.

Various aspects of the present invention involve communication approaches for a variety of computer circuits and systems, such as those including packet-type communications such as PCI-type systems and others. The present invention is exemplified in a number of implementations and applications, some of which are summarized below.

According to an example embodiment of the present invention, packet-based data is processed using both rule-based and performance-based ordering approaches. Packet streams are communicated in accordance with the packet and rule-based processing.

In another example embodiment of the present invention, protocol rule-based ordering of packets is implemented separately from performance-based ordering of the packets in a system employing a rule-based processing approach. For instance, where the system is a PCI Express system, protocols and other rules are implemented for ordering (and processing) the packets. Performance-based ordering of the packets is carried out separately from the rule-based ordering, while meeting the protocols and other rules employed by the PCI Express (or other) system.

A communications arrangement includes a packet processor adapted for implementing an arbitration scheme for separate signaling approaches for protocol-based and performance-based ordering. The packet processor is implemented, for example, where packet streams are merged or otherwise communicated. In some instances, the packet processor manages the communication of packet streams on different channels and any associated merging of the packet data using the arbitration scheme.

In one implementation, the packet processor is adapted for use with a particular protocol-based system such as a PCI Express type of system. The packet processor is programmed to carry out an arbitration scheme for processing the packet data in accordance with protocols associated with the protocol-based system while separately implementing a performance-based processing approach. For instance, where multiple data streams are communicated, a priority or other characteristic-based communications approach is carried out for managing (e.g., selecting) the order in which the packets are to be processed in accordance with the protocols. Further, while meeting the protocol requirements, the packet processor further manages the order in which the packets are processed to meet certain performance criteria while continuing to meet the protocol requirements.

The above summary of the present invention is not intended to describe each illustrated embodiment or every implementation of the present invention. The figures and detailed description that follow more particularly exemplify these embodiments.

The invention may be more completely understood in consideration of the following detailed description of various embodiments of the invention in connection with the accompanying drawings, in which.

Figure 1A:
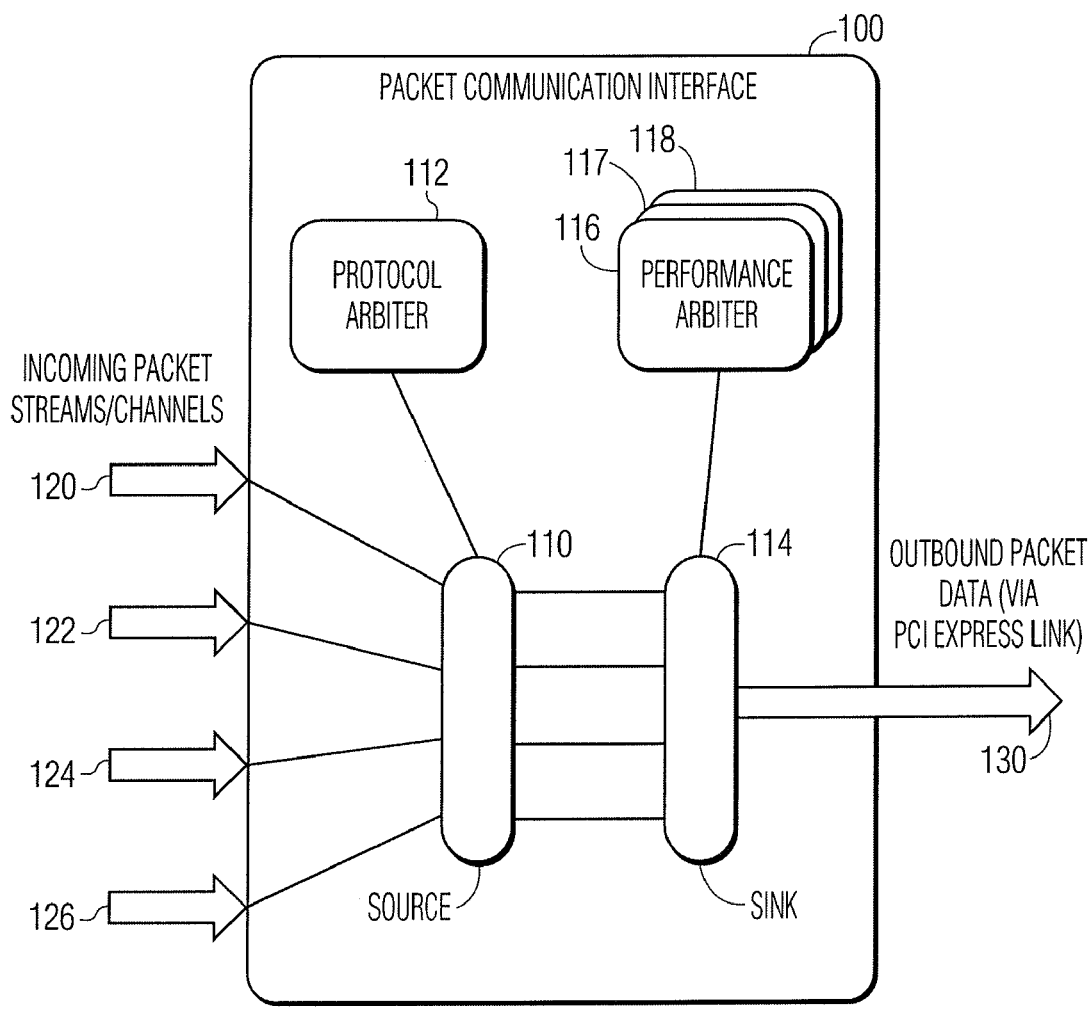
FIG. 1A is an arrangement for communications involving packet processing in a packet-based system, according to an example embodiment of the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

The present invention is believed to be applicable to a variety of circuits and approaches involving electronic communications, and in particular to those involving communications involving packet-based information. While the present invention is not necessarily limited to such applications, an appreciation of various aspects of the invention is best gained through a discussion of examples in such an environment.

According to an example embodiment of the present invention, a communications approach involves processing packet data in a protocol-based system. The packet data (including, e.g., multiple packet types from a set of source or destination buffers) is ordered in accordance with a packet arbitration approach involving the enforcement of ordering rules of the specified protocol, and further involving the enforcement of performance rules in a manner that facilitates compliance with the protocol. In this regard, performance-driven processing approaches can be implemented (e.g., independently) relative to protocols used for particular communication approaches.

In one implementation, streams of packet data are arranged and passed on a common communications link in accordance with the protocol. Packet data in the streams is ordered, relative to other packet data, for passage on the common communications link as a function of the protocols. The ordered packet data is then further ordered as a function of one or more performance-based rules while maintaining compliance with the protocols by which the packet data was ordered.

In some applications, packet data passed in an ordered arrangement along a packet communications link (e.g., as discussed above) is ordered at a receiving end of the link. A packet receiving arbitration approach applies ordering rules of the specific protocol and also further involving the application of performance rules. For instance, once packet data is ordered and passed along a communications link as described above, a packet arbitration function at a receiving point of the communications link processes the packets for delivery to a receiving function.

In one implementation, different packet types are stored in separate channel buffers at the receiving point, each channel buffer associated with a particular packet type. A protocol arbitration function generates a "valid" signal for each buffer or buffers that are available for data transfer in accordance with the protocol ordering rules. A performance arbitration function then selects a channel among these "valid" channels, in accordance with performance rules, to pass along to a receiving function. In some applications, a single communication interface/link arrangement implements both the above-discussed arbitration approach for ordering packet data for passage along the link, and the packet receiving arbitration function (i.e., the combination carrying out both transmitting and receiving functions).

In another implementation, streams of packet data are passed using multiple communication channels. The protocol and performance rules are used to select a channel from which to pass the packet data according to a variety of characteristics, such as destination, source, and timestamp characteristics associated with the packet data. The protocols are met while enhancing performance by selecting channels among those indicated as valid (in accordance with the protocol rules) from which to pass the packet data efficiently for the particular application. In addition, management of the passage of data on the channels is further carried out in a manner to reduce or eliminate data collisions between channels.

In another example embodiment of the present invention, a protocol-based packet processing arbitration approach is implemented separate protocol and performance functions. The protocol function generates controls (i.e., signals) for the communication of packet streams on a particular communications link, the controls facilitating the merging of the streams and other communications functions. A performance function further generates controls for the communication of the packet streams, the controls facilitating certain performance-based functions while, together with the protocol function controls, maintaining compliance with protocol-based rules. In this regard, the controls generated by the performance function facilitate the adaptation of performance rules (approaches) without necessarily risking violation of the protocol (e.g., one block can enforce protocol rules that are reused with multiple interfacing blocks that have different performance requirements). These controls are then implemented for communications control, such as for controlling the merging of packet data at a particular point in the communications link. Further, the controls can be selectively (e.g., separately) implemented for achieving both protocol compliance and performance-related goals.

In some implementations, the protocol function is adapted for implementation with different performance functions, facilitating a multitude of different performance-based processing approaches. For example, different types of data or different data communications arrangements and applications often benefit from different types of performance-related communications approaches. Different types of packetized data (e.g., Posted Requests, Non-Posted Requests and Completions) can be communicated between a source and destination. In this regard, the separation of the performance function from the protocol function makes possible the implementation of different performance-based rules (functions) with a common protocol function and with a common packet processing arbiter. Furthermore, different performance functions can be implemented together with a particular protocol function for processing of a particular packet stream or streams.

In another example embodiment of the present invention, a communications system includes a communications link coupled to components and a link controller (e.g. arbiter) configured for controlling the communication of packet streams on the communications link and/or between the components. The link controller is implemented, e.g. using a software approach involving protocol and performance arbiters that generate controls using separate protocol and performance functions. The protocol function generates control signals for processing the packet streams in accordance with system communications protocols. The performance function (or functions) generates control signals for achieving certain performance-related conditions associated with the processing of the packet streams.

In one implementation, the communications link is a standard link configured for operation in accordance with certain regulated standards that have certain communications protocol requirements. The protocol function controls the communication of packet streams in accordance with the protocols. Further, the link controller implements one or more performance functions with the protocol function while maintaining compliance with the regulated standards. This approach facilitates the tailoring of the performance functions to particular communications approaches without necessarily integrating those performance functions with the protocol functions.

In another implementation, the communications link is configured in accordance with the PCI Express standard (discussed above) and is implemented with a PCI Express link such as a bus or switch. Various aspects of the PCI Express bus and the communications system are implemented in accordance with PCI Express standards (or related/derivational standards). The protocol function is configured for compliance with PCI Express protocols and is implemented together with one or more performance functions by separate arbiters. The protocol arbiter controls the merging and related ordering of packet data in the packet data streams using the PCI Express protocol function to comply with the PCI Express standard. Further, the performance arbiter controls the ordering of the packet data in accordance with selected performance protocols while complying with the PCI Express protocols upon which the protocol-based ordering is based.

For more information regarding the above-mentioned functions (and others herein) as implemented in connection with "PCI Express" applications and/or compliance with "PCI Express," reference may be made to "PCI Express Base Specification Revision 1.0a," April 2003, available from PCI-SIG (PCI-special interest group) of Portland, Oreg. Approaches that are compliant with this PCI Express Base Specification can be considered "PCI Express-compliant."

Turning now to the figures, FIG. 1A shows a PCI Express packet communication interface 100, according to another example embodiment of the present invention. The PCI Express packet communication interface 100 includes packet source 110 and packet sink 114 functions that control the presentation of packet data for communication on a PCI Express link 130. The packet source 110 and packet sink 114 respectively implement separate protocol and performance arbiters 112 and 116 for ordering packet data respectively in accordance with PCI Express and performance protocols.

Packet data streams are received on one or more of incoming channels 120, 122, 124 and 126. A packet source 110 implements the protocol arbiter 112 to enforce ordering rules specified by the PCI Express Base Architecture Specification and presents (e.g., assigns) a "valid" signal(s) indicating that a P/NP/CPL packet channel (one of channels 120, 122, 124 and 126) has a valid packet that meets PCI Express protocol ordering requirements. Where ordering rules permit a packet in one channel to pass a packet in another channel, multiple channels are indicated as available with simultaneous "valid" indications. The packet sink 114 implements the performance arbiter 116 to select which of the valid channels to accept a packet from.

The source 110 and sink 114 implement the arbiters using one or more of a variety of approaches, depending upon the application. In some implementations, additional performance arbiters such as arbiters 117 and 118 are selectively implemented with or in alternative to performance arbiter 116 and each other, with each arbiter configuration implemented for selected performance-related communications characteristics.

In another implementation, the sink 114 implements the performance arbiter 116 to use timestamp information provided with each packet to select the channel (i.e., among valid channels meeting the PCI Express protocol) with the oldest packet. That is, among channels 120, 122, 124 and 126 identified by the source 110 to be valid (as in accordance with PCI Express standards carried by protocol arbiter 112), the sink 114 checks the timestamp of packet data available on each channel indicated to hold a valid packet. With this approach, PCI Express protocols are adhered to while further ensuring that, from a timestamp perspective, the oldest packet is passed first. In this regard, this approach is applicable for use with first-come first-served (FCFS) packet processing.

In another implementation, an arbitration scheme is implemented by the sink 114 using the performance arbiter 116 to give priority to one of the (valid) channels based on characteristics of the particular packet communication. For instance, priority may be given relative to one or more of: the packet destination (e.g., a device coupled via the PCI Express link 130), packet source (a device on the incoming channel (s)) or the number of packets in a channel's buffer (e.g., a channel's queue relative to that of other channels' buffers). These performance-based priority schemes can be implemented without necessarily changing or risking violation of the protocol ordering rules implemented by the source 110 using the protocol arbiter 112.

Figure 1B:
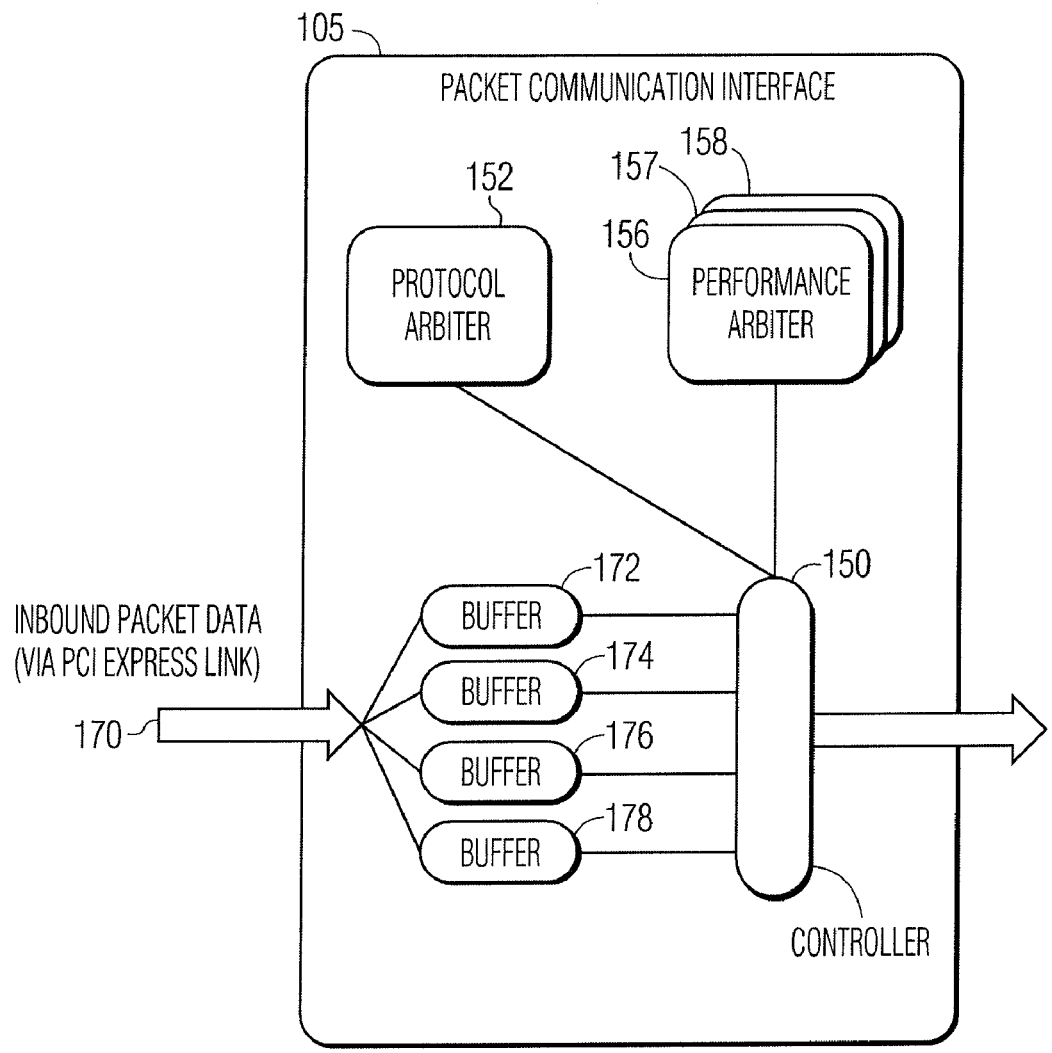
FIG. 1B is an arrangement for communications involving packet processing in a packet-based system, according to another example embodiment of the present invention.

FIG. 1B is an arrangement 105 for communications involving packet processing at a receiving end of a packet-based system, according to another example embodiment of the present invention. FIG. 1B can be implemented similar to FIG. 1A. FIG. 1B has a protocol arbiter 152 and performance arbiters 156-158 respectively performing protocol ordering and performance ordering of packet data.

Inbound packet data 170 received via a PCI Express link is arranged in buffers 172-178 according to packet type (e.g., with each buffer storing a particular packet type). While four buffers 172-178 are shown, a multitude of buffers and/or buffer types are implemented in connection with the arrangement 105 to meet particular application needs.

A controller 150 implements a protocol arbiter 152 that orders the packets by assigning one or more of the buffers 172-178 as a "valid" buffer. The controller 150 then implements one or more performance arbiters 156-158 to select one or more of the buffers 172-178 indicated as a "valid" buffer from which to pass packets to a receiving function. Although not shown in FIG. 1B, the protocol arbiter 152 and performance arbiters 156-158 can be implemented to communicate separately with source and sink blocks (e.g., 110 and 114 of FIG. 1A) rather than the controller 150.

In one implementation, the arrangements 100 and 105 respectively shown in FIGS. 1A and 1B are implemented on a common communications link, with link 130 in FIG. 1A and link 170 in FIG. 1B being the same link. In this regard, the arrangement 100 is a transmission portion of the common link and the arrangement 105 is the receiver portion of the common link. Each of the transmission and receiver portions implementing protocol and performance arbiters as shown, with the arbiters selectively implemented using different protocol and/or performance rules.

In another implementation, the arrangements 100 and 105 respectively in FIGS. 1A and 1B are implemented as a single communications arrangement with bi-directional PCI Express transmitter/receiver functionality.

Figure 2:
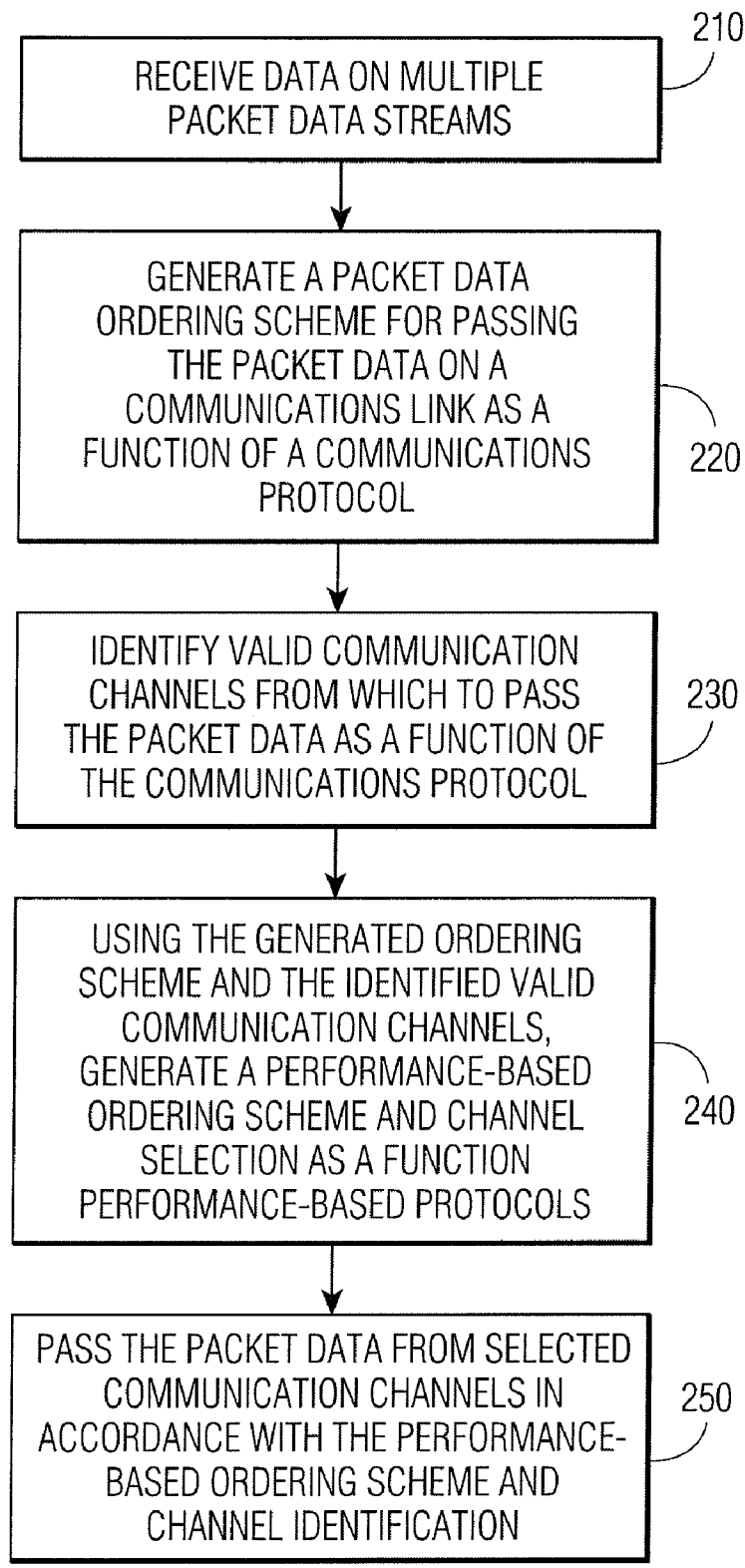
FIG. 2 is a flow diagram for an approach to packet processing in a packet-based system, according to another example embodiment of the present invention.

FIG. 2 is a flow diagram for an approach to packet processing in a packet-based system, according to another example embodiment of the present invention. At block 210, packet data is received from multiple packet data streams (on a channel or channels) for passage on a protocol-based communications link. The data is received, e.g. concurrently for part or all of each data stream, relative to the other data streams and, e.g., on multiple channels. At block 220, an ordering scheme for communicating the packet data on the communications link is generated using a communications protocol (or protocols) for the particular system in which the packet data is being communicated. For instance, where used with a PCI Express system, PCI Express communications protocols (relating, e.g., to packet ordering priority) are used to order packet data at block 220. The ordering scheme assigns a particular order for passing each packet, such that each communication channel or range of channels having a packet that is ready for transfer (in accordance with the communication protocols) is identified as a valid channel at block 230.

At block 240, after the packet data has been ordered and one or more valid communications channels have been identified, performance-based rules are called (implemented) to reassign ordering and/or communication channels from which to pass packet data while maintaining compliance with the protocols used at blocks 220 and 230. For example, certain packet characteristics such as destination, source, and/or timestamp characteristics can be implemented with performance protocols to order the packets for passing on a communications link (e.g., switch, bus or emulated link). A level or levels of importance can be assigned to particular packet characteristics and used to weigh the importance of individual packets, relative to other packets, when ordering the packets for communications.

Using the generated ordering scheme and identified valid communication channels, a performance-based ordering scheme and channel selection are generated as a function of performance-based protocols. These performance-based protocols can be implemented independently from the implementation of the communications protocol, such that different types of performance-based protocols can be implemented for different data and/or communications approaches at block 240, while using a common communications protocol.

Once the packet data has been ordered and a particular communications channel has been selected at block 240, the packet data is passed on a communication link or links (e.g., a PCI Express link) in accordance with the performance-based ordering scheme and channel selection at block 250. This passage of the packet data is carried out in accordance with the communications protocol-based ordering scheme, thus facilitating compliance therewith.

Figure 3:
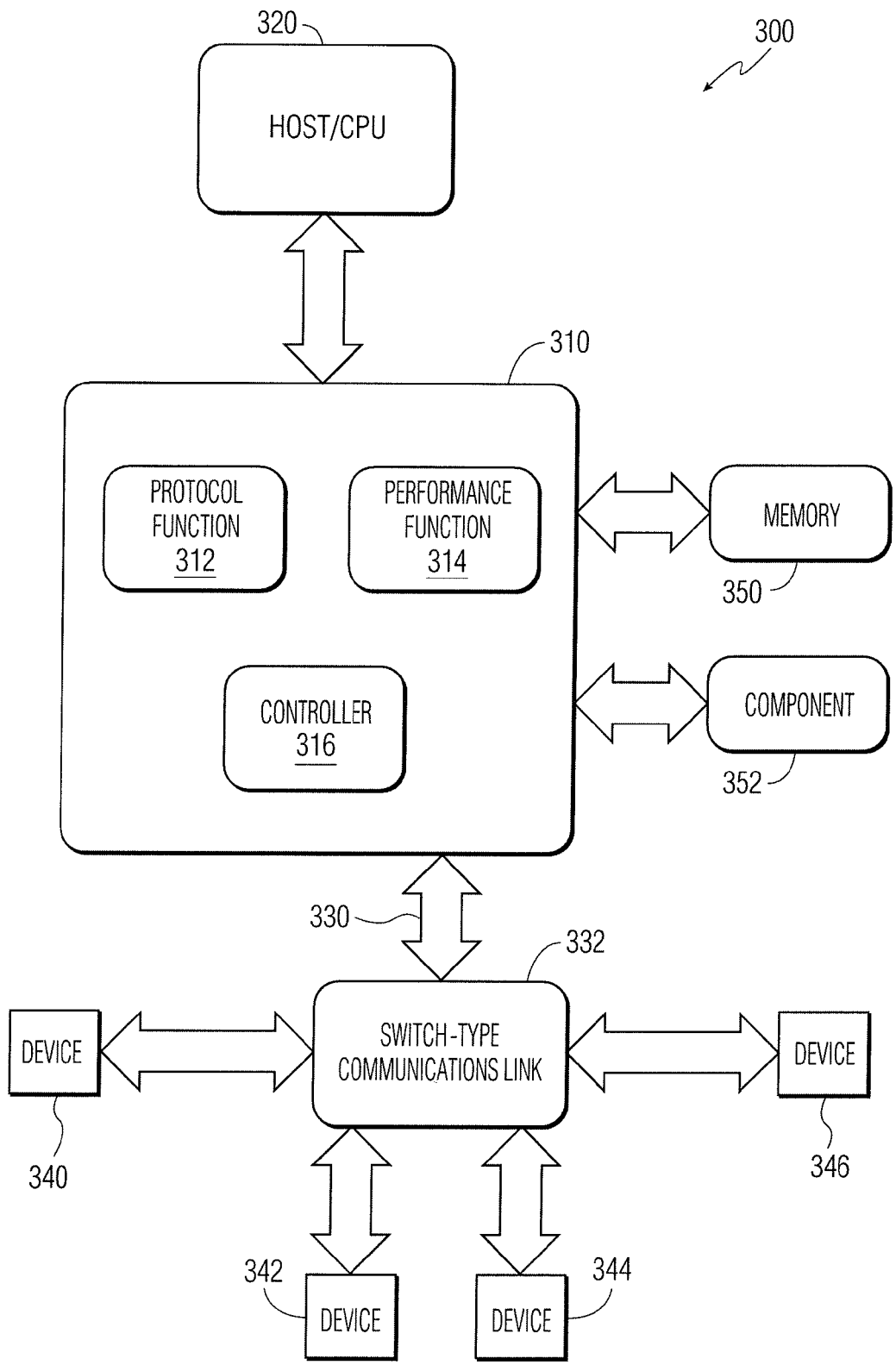
FIG. 3 shows a packet communications interface 300, according to another example embodiment of the present invention.

FIG. 3 shows an arrangement 300 for communications involving packet processing in a packet-based system, according to another example embodiment of the present invention. A packet processing arrangement 310 includes protocol and performance functions 312 and 314, respectively, used by a controller 316 (e.g., with separate protocol and performance arbiters) to order and communicate packet data on a communications link 330. The packet processing arrangement 310 is coupled to a host CPU 320, memory 350 and to one or more components 352, such as a display or disk drive.

The link 330 is coupled to a switch 332, which in turn couples to multiple devices including devices 340, 342, 344 and 346. The link 330 and switch 332 can be implemented together and/or emulated in connection with communications protocols (e.g., with PCI Express protocols).

When packet data from a source (e.g., from memory 350) is to be passed via the communications link 330, the controller 316 implements the protocol function via a protocol arbitration scheme to order the data in accordance with predefined protocol rules. The controller 316 then further implements the performance function 314 via a performance arbitration scheme, separate from the protocol arbitration scheme, to further order the data in accordance with performance-based rules. This ordered data is then passed to one or more of the devices 340-346 in accordance with the protocol function and further enhanced via the performance function 314.

The arrangement 300 is implemented in a variety of manners, depending upon the application. For example, where implemented with a general purpose desktop/mobile PCI Express computing approach, the arrangement 300 provides an I/O (input/output) interconnect function involving, e.g., memory and I/O bridges and PCI Express communications link control and/or emulation. Where implemented with a PCI-Express-based server/workstation or network system, the arrangement 300 involves implementation of a chipset with communication links to CPU's, memory and other components, with PCI Express-based links and corresponding PCI Express communications link control and/or emulation.

The various embodiments described above and shown in the figures are provided by way of illustration only and should not be construed to limit the invention. Based on the above discussion and illustrations, those skilled in the art will readily recognize that various modifications and changes may be made to the present invention without strictly following the exemplary embodiments and applications illustrated and described herein. For instance, protocols other than PCI Express may be amenable to implementation using similar approaches. In addition, one or more of the above example embodiments and implementations may be implemented with a variety of PCI Express devices and other approaches, including chips and printed circuit boards (PCBs). The above example embodiments and implementations may also be integrated with a variety of circuits, devices, systems and approaches including those for use in connection with storage, display, networking and mobile communications. Moreover, various embodiments discussed in the context of PCI and PCI Express type applications may be implemented using a variety of devices and communications approaches, including those not necessarily applicable to PCI or PCI Express. These approaches are implemented in connection with various example embodiments of the present invention. Such modifications and changes do not depart from the true spirit and scope of the present invention that is set forth in the following claims.

What is claimed is:

1. A method for managing packet-based communications in a rules-based system, the method comprising:
    in a packet processor,
        generating a protocol-based ordering configuration for passing packet data as a function of protocol compliance rules for the rules-based system, and
        generating a performance-based communications order for passing the packet data as a function of performance-based rules and the generated protocol-based ordering configuration; and
    communicating the packet data as a function of the performance-based communications order.

2. The method of claim 1, wherein generating a protocol-based ordering configuration for passing packet data as a function of protocol compliance rules for the rules-based system includes using a first arbiter to generate the protocol-based ordering configuration, and wherein generating a performance-based communications order for passing the packet data as a function of performance-based rules and the generated protocol-based ordering configuration includes using a second separate arbiter to generate the performance-based communications order.

3. The method of claim 1, further comprising: receiving the communicated packet data; generating a receiving protocol-based ordering configuration for passing the communicated packet data to a receiving function as a function of protocol compliance rules for the rules-based system; generating a receiving performance-based communications order for passing the communicated packet data to a receiving function as a function of performance-based rules and the generated receiving protocol-based ordering configuration; and passing the communicated packet data to a receiving function as a function of the generated receiving performance-based communications order.

4. The method of claim 3, wherein generating a receiving protocol-based ordering configuration for passing the communicated packet data to a receiving function as a function of protocol compliance rules for the rules-based system includes using a first receiving arbiter to generate the protocol-based ordering configuration, and wherein generating a receiving performance-based communications order for passing the communicated packet data to a receiving function as a function of performance-based rules and the generated receiving protocol-based ordering configuration includes using a second separate receiving arbiter to generate the performance-based communications order.

5. The method of claim 4, wherein: generating a protocol-based ordering configuration and a performance-based communications order for passing packet includes using a transmitter configured to implement the protocol and performance-based rules; communicating the packet data as a function of the performance-based communications order includes communicating the packet data to a receiver configured to implement the receiving protocol and receiving performance-based rules; and generating a receiving protocol-based ordering configuration and a receiving performance-based communications order includes using the receiver.

6. The method of claim 5, wherein using a transmitter and using a receiver include using an integrated communications arrangement configured with both the transmitter and receiver functions.

7. The method of claim 1, wherein generating a protocol-based ordering configuration includes identifying incoming channels from which packet data can be communicated, and wherein generating a performance-based communications order includes selecting at least one of the identified incoming channels from which to communicate the packet data.

8. For use with protocol-based communications approaches involving communications protocols for communicating packet data on a communications link, a communications circuit arrangement comprising:
    a protocol arbiter configured and arranged to assign a communications priority to the packet data as a function of the communications protocols;
    a performance arbiter configured and arranged to order the packet data for communication on the communications link as a function of the communications priority and performance rules; and
    a controller configured and arranged for controlling the passage of the packet data on the communications link as a function of the packet data ordering.

9. The arrangement of claim 8, wherein the protocol arbiter and the performance arbiter are separately implemented.

10. The arrangement of claim 8, further comprising:
    packet data channels bearing the packet data;
    wherein the protocol arbiter is configured and arranged for assigning a communications priority to the packet data by selecting ones of the communications channels that are valid in accordance with the communications protocols; and
    wherein the performance arbiter orders the packet data for communication on the communications link as a function of the communications priority and performance rules by selecting at least one communications channel from the valid channels from which to communicate packet data as a function of the performance rules.

11. The arrangement of claim 8, wherein the performance arbiter is configured and arranged for ordering the packet data for communication on the communications link as a function of performance rules based on at least one of: timestamp, source of the packet data, destination of the packet data and number of packets in queue for a particular channel from which packets are available for communication.

12. The arrangement of claim 8, wherein the performance arbiter includes multiple performance arbiter functions, each function configured to generate a performance-based communications order as a function of distinct performance-based rules.

13. The arrangement of claim 8, wherein the communications link is a PCI Express link.

14. The arrangement of claim 13, wherein the communications link is a PCI Express switch.

15. The arrangement of claim 8, wherein the communications link is an internal CPU-based link.

16. The arrangement of claim 8, wherein the communications link is a network link.

17. The arrangement of claim 8, further comprising:
    a receiver coupled to the communications link and configured and arranged for receiving the packet data passed on the communications link as a function of the packet data ordering;
    a receiving protocol arbiter configured and arranged to assign a receiving communications priority to the received packet data as a function of the communications protocols;
    a receiving performance arbiter configured and arranged for ordering the received packet data as a function of the receiving communications priority and performance-based rules; and a receiving controller configured and arranged for controlling the passage of the received packet data to a receiving function as a function of the ordering of the received packet data.

18. The arrangement of claim 17, wherein the receiver includes buffers configured and arranged for storing incoming packet data from the communications link, each buffer storing a particular type of packet data, and wherein the receiving controller controls the passage of the received packet data from the buffers to the receiving function.

19. The arrangement of claim 18, wherein the receiving protocol arbiter is configured and arranged to assign a receiving communications priority to the received packet data as a function of the communications protocols by assigning valid buffers from which to communicate packet data, and wherein the receiving performance arbiter function is configured and arranged for ordering the received packet data as a function of the receiving communications priority and performance-based protocols by selecting one of the valid buffers from which to communicate packet data as a function of the performance-based rules.

20. A packet processing circuit comprising:
   an input circuit to receive incoming packets;
   a protocol arbiter circuit configured to assign an order to the packets based upon protocol-based ordering rules;
   a performance arbiter circuit configured to reassign an order to the packets based upon the generated protocol-based ordering data and performance-based rules; and
   a communications circuit to communicate the packets in the reassigned order.

* * * * *